UNITED STATES PATENT OFFICE.

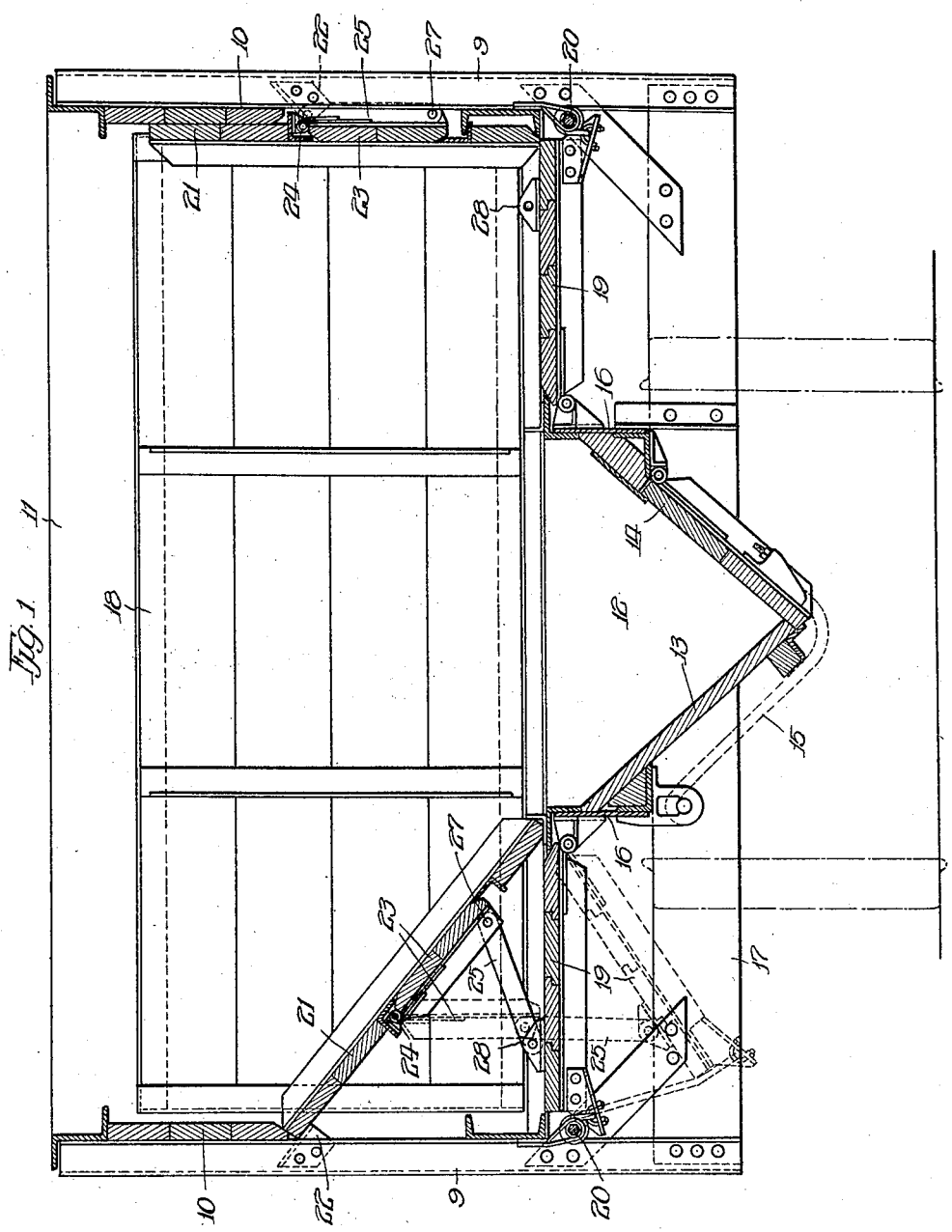

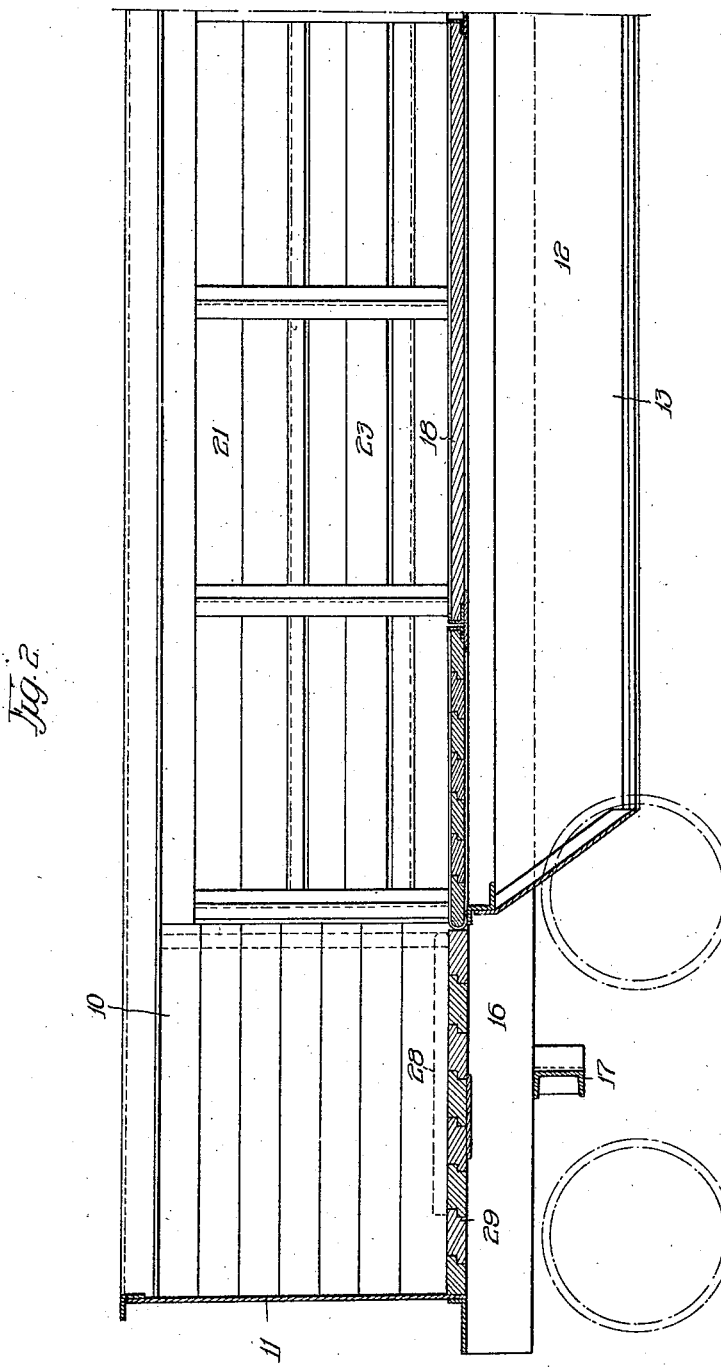

DAVID HINDAHL, OF CHICAGO, ILLINOIS, ASSIGNOR TO RODGER BALLAST CAR CO., OF CHICAGO, ILLINOIS, A CORPORATION OF MAINE.

CONVERTIBLE CAR.

1,402,422.  Specification of Letters Patent.  Patented Jan. 3, 1922.

Application filed December 31, 1919, Serial No. 348,680. Renewed November 19, 1921. Serial No. 516,514.

*To all whom it may concern:*

Be it known that I, DAVID HINDAHL, a citizen of the United States, residing at Chicago, in the county of Cook and State of Illinois, have invented certain new and useful Improvements in Convertible Cars, of which the following is a specification.

This invention relates to convertible cars.

When dump cars are loaded, it is not always known whether it is desirable to center or side dump the load. In the early Hart convertible car, when the car was arranged with a flat bottom, the load was dumpable only to the sides of the car, and when arranged as a hopper type of car, the load was dumpable centrally only. There are certain advantages in being able to side dump a portion of the load when the car is arranged as a hopper center dump type; for instance, in ballast work. It is also advantageous to accurately control the flow of dumpable material in ballast work.

Accordingly, one object of my invention is to make it possible to dump a load in an accurately controlled manner to the sides of a convertible car in addition to centrally dumping the load, especially when the car is arranged as a hopper central dump car.

Another object is to provide a simple convertible car construction arranged for selectively dumping a load in an accurately controlled manner and also in a manner to meet operating requirements.

These and other objects are accomplished by means of the arrangement disclosed on the accompanying sheets of drawings, in which—

Figure 1 is a transverse sectional view of a convertible car embodying my invention; and Figure 2 is a longitudinal sectional view of the same car.

The various novel features of the invention will be apparent from the following description and drawings and will be particularly pointed out in the appended claims.

Referring to the figures of the drawings, it will be noted that I have shown a convertible car having sides 10, including side stakes 9, ends 11, and a bottom, the central portion of which is in the form of a hopper 12, having a stationary sloping side 13 and a movable sloping side or door 14, which may be operated by any suitable mechanism 15 and by means of which a load may be dumped centrally. This hopper 12 is located intermediate the longitudinally extending sills 16, which preferably are continuous, said sills being mounted over and supported by continuous cross beams 17 which connect the sides of the car for transmitting the load thereto.

When the car is used as a flat bottom car, the central hopper 12 is covered partially by members 18 which act as hopper ends when the car is arranged as a hopper car, as shown in dotted lines in Figure 2, it being understood that there is a hopper end wall 18 at each end of the hopper, said walls being spaced from the permanent ends 11 of the car. By using the hopper ends 18 as flat floor portions to cover the hopper, the loading space of the car is unobstructed. The remaining portion of the hopper 12 at each end is covered by a movably mounted member 28, which when the car is used as a hopper car is moved over upon the floor end portion 29, as shown in dotted lines in Figure 2. On each side of the hopper portion, the floor is composed of doors 19 pivotally connected to the sill construction 16, said doors being provided with any suitable mechanism 20, whereby the doors may be raised into closed position after having been opened for side dumping purposes.

The sides of the car also include members 21, which when the car is arranged as a flat bottom car occupy a vertical position adjacent the stakes 9, as shown at the right hand side of Figure 1. These sides, however, may be moved into an inclined position as shown at the left hand side of said figure, in which position they form continuations of the inclined hopper walls. These walls 21 may be supported in their inclined positions in any suitable manner, such as by brackets 22.

In ballast work, it is desirable at times to dump some of the load sidewise as well as centrally, and in addition thereto, it is desirable to accurately control the flow of dumpable material so that any amount of material may be dumped to the sides of the car or centrally with respect thereto while the car is either stationary or traveling along the tracks. To make such possible, I have provided the side members 21 with doors 23, which are pivotally mounted at 24 at their upper ends, and which normally are supported in closed or inclined position by links 25. The link in each case is pivotally connected at one end at 27 to the lower end of the door 23, the other end of the link being pivotally connected at 28 to the associated bottom dump door 19 near the outer end thereof. From this arrangement, it is apparent that when the side floor doors 19 are permitted to open, the hopper wall side doors 23 are opened simultaneously to accurately control the flow of dumpable material from the car to the sides thereof, it being understood that the doors may be opened to any desired extent.

By means of the link connection between the doors 19 and 23, they are at all times movable simultaneously, and accordingly when the floor doors 19 are moved to closed position by the door operating mechanism 20, the hopper side wall doors 23 are moved toward closed position at the same time. By means of this link connection, not only are the hopper side wall doors 23 supported in their closed position, but the flow of the dumpable material is controlled to a nicety.

Of course, it is appreciated that the load may be dumped centrally of the car by permitting the dump door 14 to be moved into an open position. If it is desirable to dump all of the load centrally, the same may be done by maintaining the side dump doors 19 and 23 in closed position.

It is my intention to cover all modifications of the invention falling within the spirit and scope of the following claims.

I claim:

1. A convertible car having a bottom with a hopper portion, a floor door mounted adjacent said hopper portion, a car side member movable into a position to form a hopper side portion and having a door, and means connecting said doors whereby both are moved simultaneously at all times to accurately control the flow of dumpable material.

2. A convertible car having a bottom with a hopper portion, a floor door mounted adjacent said hopper portion, a car side member movable into a position to form a hopper side portion and having a door, and a link connecting said doors whereby both are moved simultaneously at all times to accurately control the flow of dumpable material.

3. A convertible car having a bottom with a hopper portion, a floor door mounted adjacent said hopper portion, a car side member movable into a position to form a hopper side portion and having a door, and means connecting said doors whereby both are moved simultaneously toward an open or closed position to accurately control the flow of dumpable material.

4. A convertible car having a bottom with a side dump door, a car side member movable in a position to form a hopper side portion and having a door, and means connecting said doors whereby both are movable simultaneously at all times to accurately control the flow of dumpable material.

5. A convertible car having a bottom with a side dump door, a car side member movable into a position to form a hopper side portion and having a door, a connection between said doors, a door operating mechanism connected to one of said doors whereby the flow of dumpable material is controlled.

6. A convertible car having a bottom with a hopper portion, a floor door mounted adjacent said hopper portion, a car side member movable into a position to form a hopper side portion and having a door, a link connecting said doors whereby both are movable simultaneously, and door operating mechanism connected to one of said doors.

7. A convertible car having a floor comprising a horizontally arranged drop door, a hopper portion provided with a swinging door adjacent said drop door, and a connection between the drop door and the swinging door whereby the opening and closing of one of the doors is controlled by the opening and closing of the other.

8. A convertible car having a floor comprising a drop door, a hopper portion provided with a swinging door adjacent said drop door, and a rigid member pivotally connecting the doors whereby the opening and closing of one of the doors is controlled by the opening and closing of the other.

Signed at Chicago, Illinois, this 22nd day of December, 1919.

DAVID HINDAHL.